UNITED STATES PATENT OFFICE.

JOSEPH T. MAYBURY, OF MOBILE, ALABAMA.

PROCESS PRELIMINARY TO THE CANNING OF OYSTERS.

SPECIFICATION forming part of Reissued Letters Patent No. 9,509, dated December 21, 1880.

Original No. 230,561, dated July 27, 1880. Application for reissue filed September 30, 1880.

*To all whom it may concern:*

Be it known that I, JOSEPH THOMAS MAYBURY, of Mobile, in the county of Mobile and State of Alabama, have invented an Improved Process Preliminary to the Canning of Oysters, of which the following is a specification; and I do hereby declare that in the same is contained a full, clear, and exact description thereof.

Prefatory to a description of my invention it may be proper to say that oysters found in the Gulf of Mexico differ from those obtained in more northern waters, in that their structure is less compact, and therefore more easily disorganized in any cooking process to which they may be submitted. This difference in structure of the tissues of the two kinds of oysters is such that, while the Chesapeake Bay oyster may be canned and made to preserve its form during and for an indefinite period of time after the canning process, the Gulf oyster under similar circumstances is thoroughly disorganized and changed in condition.

The object of my invention is to render Gulf oysters less liable to disintegration during the cooking process which forms a part of the ordinary canning operation; and to this end I first harden the tissues and membrane of the oysters by treating them with a chemical mixture in a process which consists as follows: The oysters as shucked are placed in cans and a heated mixture of water, vinegar, salicylic acid, and common salt, in suitable proportions, poured over them. This mixture has the effect of toughening or hardening the membrane and tissues of the oysters, and renders them better able to withstand the disintegrating action of water in the subsequent canning process to which they are subjected.

The proportions of the above-named ingredients which I have found best suited to produce the result desired are as follows: water, ten gallons; vinegar, one-half gallon; saturated solution of salicylic acid in water, one and six-tenths gill; common salt, a sufficient quantity. In this mixture the quantity of acid is so small that the flavor of the oysters is not affected by it, while it is sufficient to coagulate the albuminous portion of the oyster and render the same partially insoluble in water.

I claim as my invention—

A process preliminary to the canning of oysters, which consists in subjecting the said oysters to the action of a mixture of vinegar, solution of salicylic acid, and salt, substantially as herein specified.

JOSEPH THOMAS MAYBURY.

Witnesses:

GAYLORD B. CLARK,

T. F. TOWNSLEY.